Figure 1:
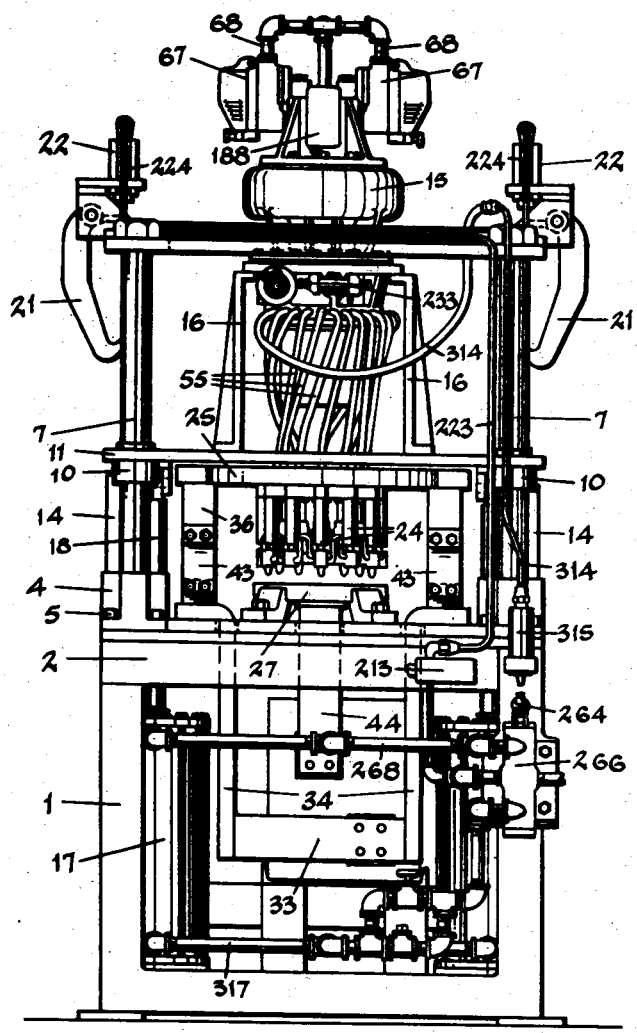

Sept. 19, 1939.  W. H. MARTIN  2,173,368
WELDING MACHINE
Filed Nov. 15, 1937  10 Sheets—Sheet 1

Inventor
William H. Martin
By [signature]
Attorney

Sept. 19, 1939.  W. H. MARTIN  2,173,368
WELDING MACHINE
Filed Nov. 15, 1937  10 Sheets—Sheet 2

Inventor
William H. Martin

Sept. 19, 1939. W. H. MARTIN 2,173,368
WELDING MACHINE
Filed Nov. 15, 1937 10 Sheets-Sheet 3

Inventor
William H. Martin
By Faust F. Crampton.
Attorney

Sept. 19, 1939.　　　　W. H. MARTIN　　　　2,173,368
WELDING MACHINE
Filed Nov. 15, 1937　　　　10 Sheets-Sheet 4

Inventor
William H. Martin
By Stuart F. Crampton
Attorney

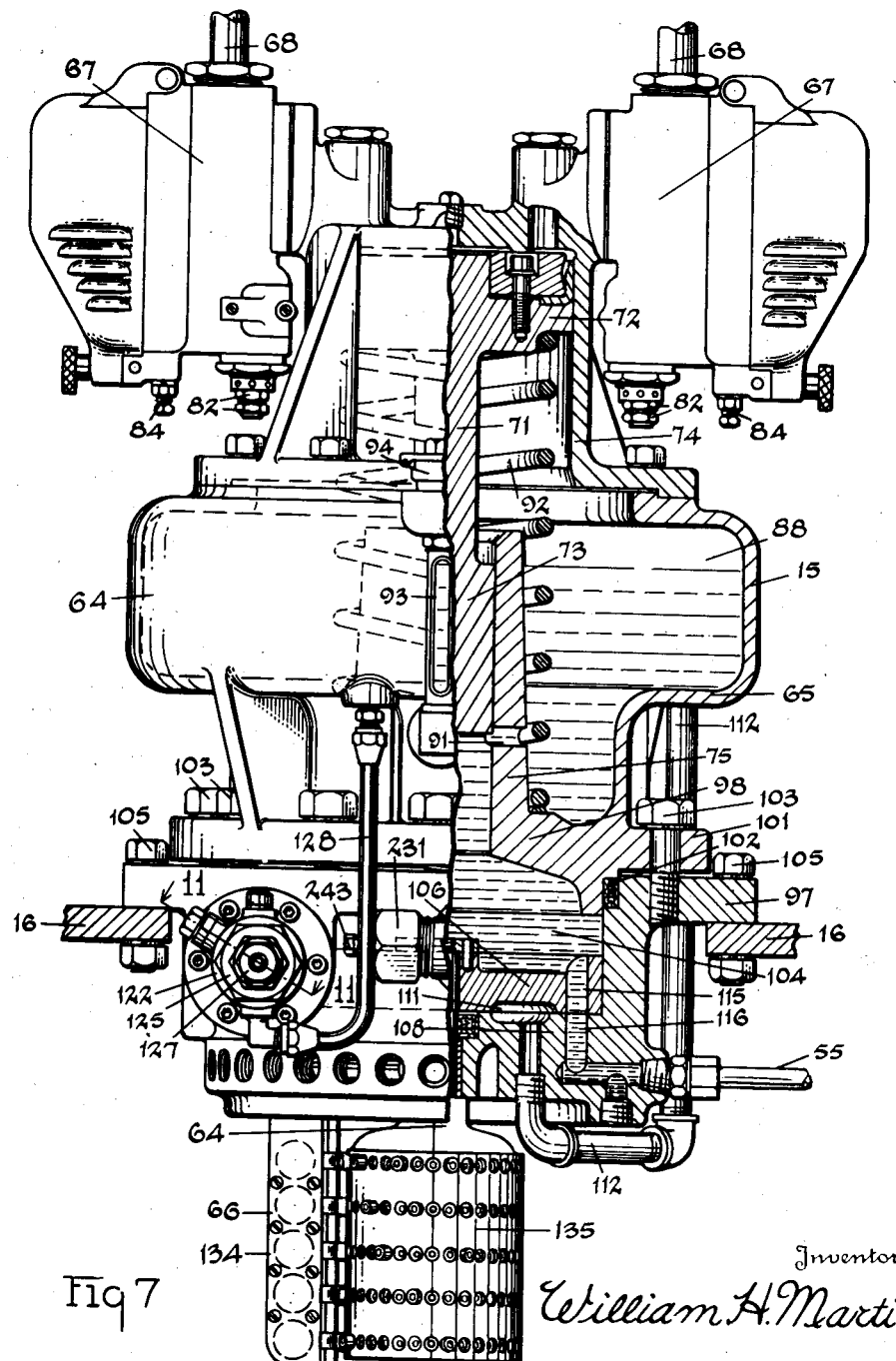

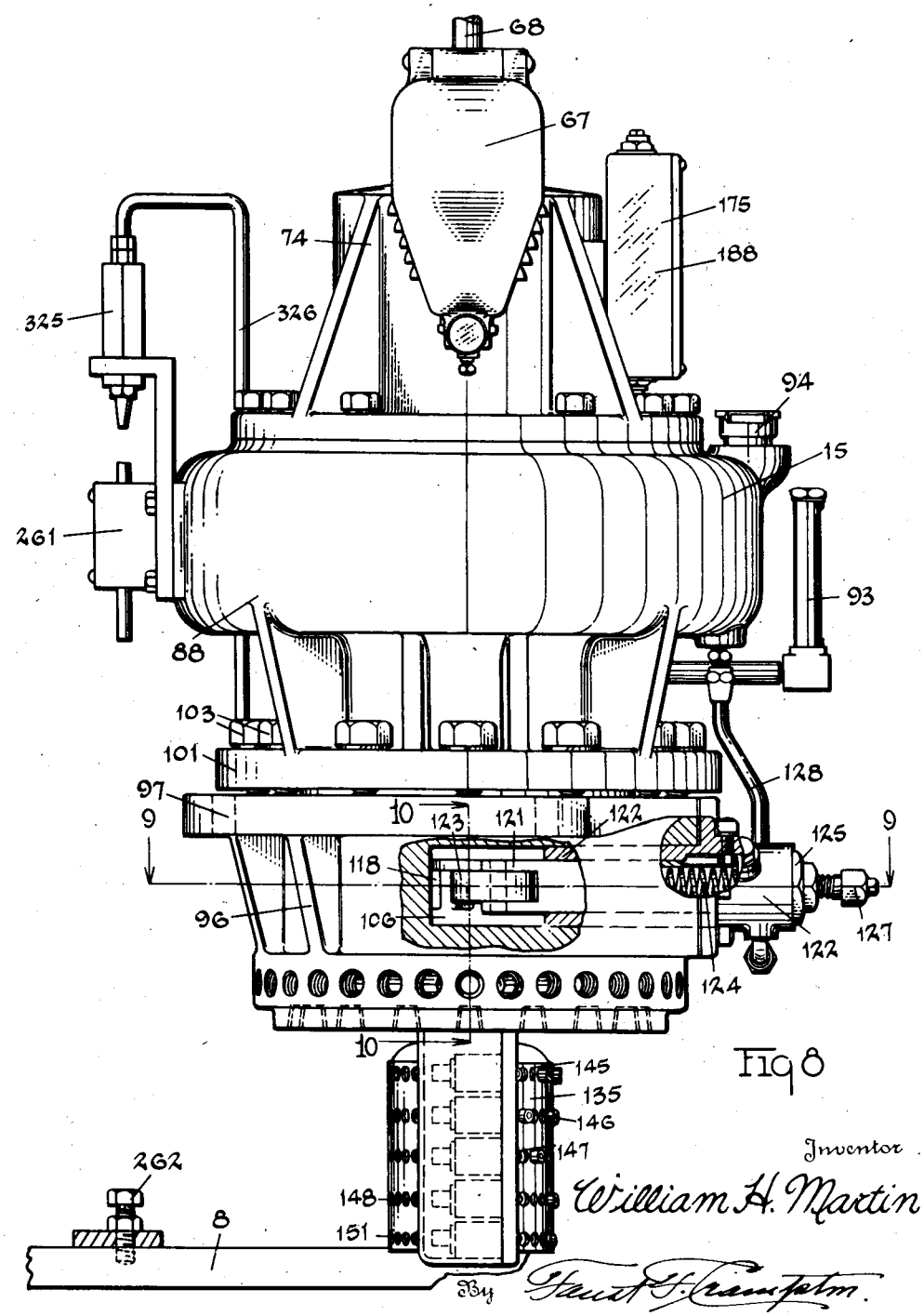

Sept. 19, 1939.  W. H. MARTIN  2,173,368
WELDING MACHINE
Filed Nov. 15, 1937   10 Sheets-Sheet 7
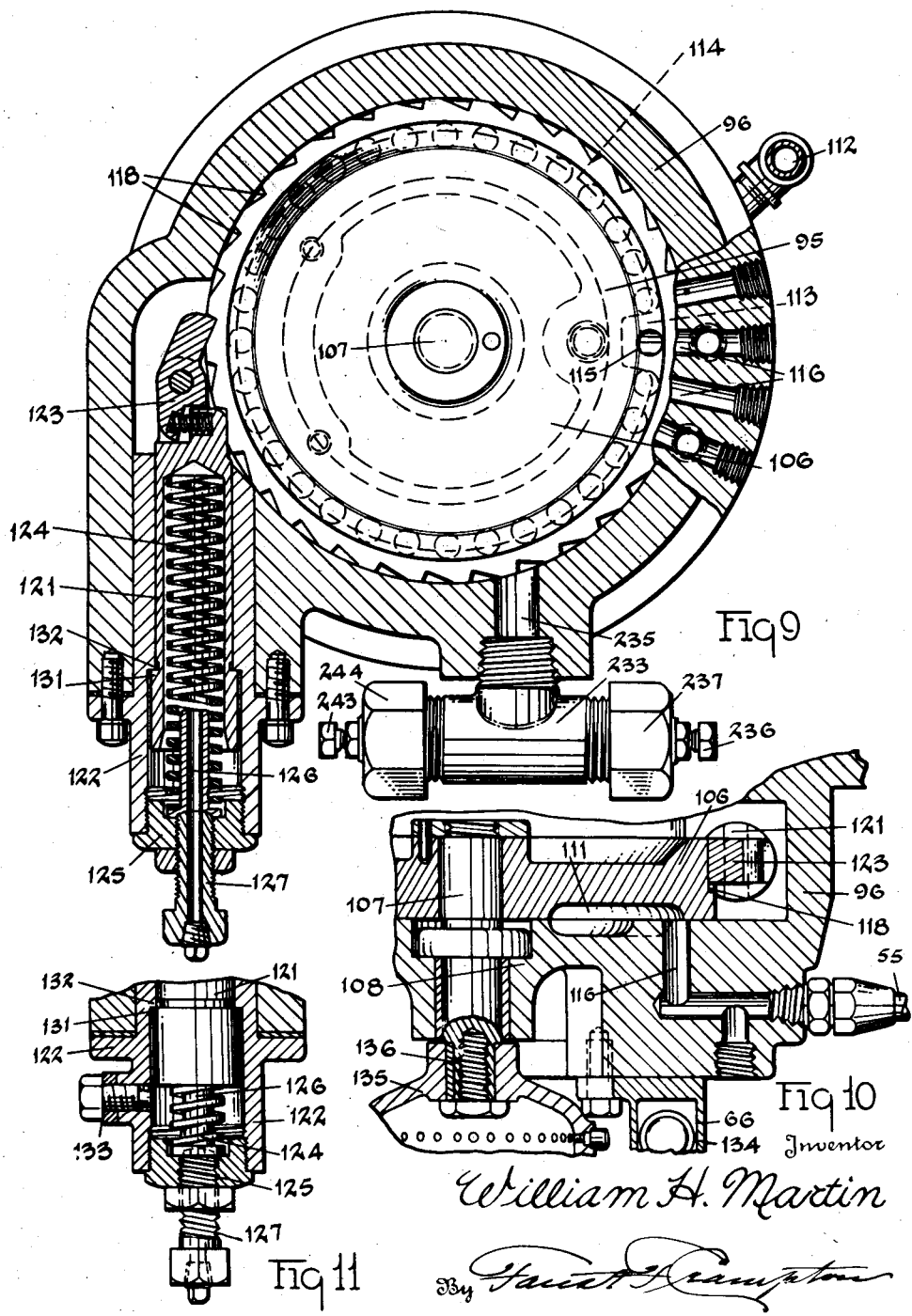

Sept. 19, 1939.                 W. H. MARTIN                 2,173,368
                               WELDING MACHINE
                       Filed Nov. 15, 1937        10 Sheets-Sheet 8

Inventor
William H. Martin
By (signature)
Attorney

Sept. 19, 1939.  W. H. MARTIN  2,173,368
WELDING MACHINE
Filed Nov. 15, 1937    10 Sheets-Sheet 9

Inventor
William H. Martin
By Faust & Crampton
Attorney

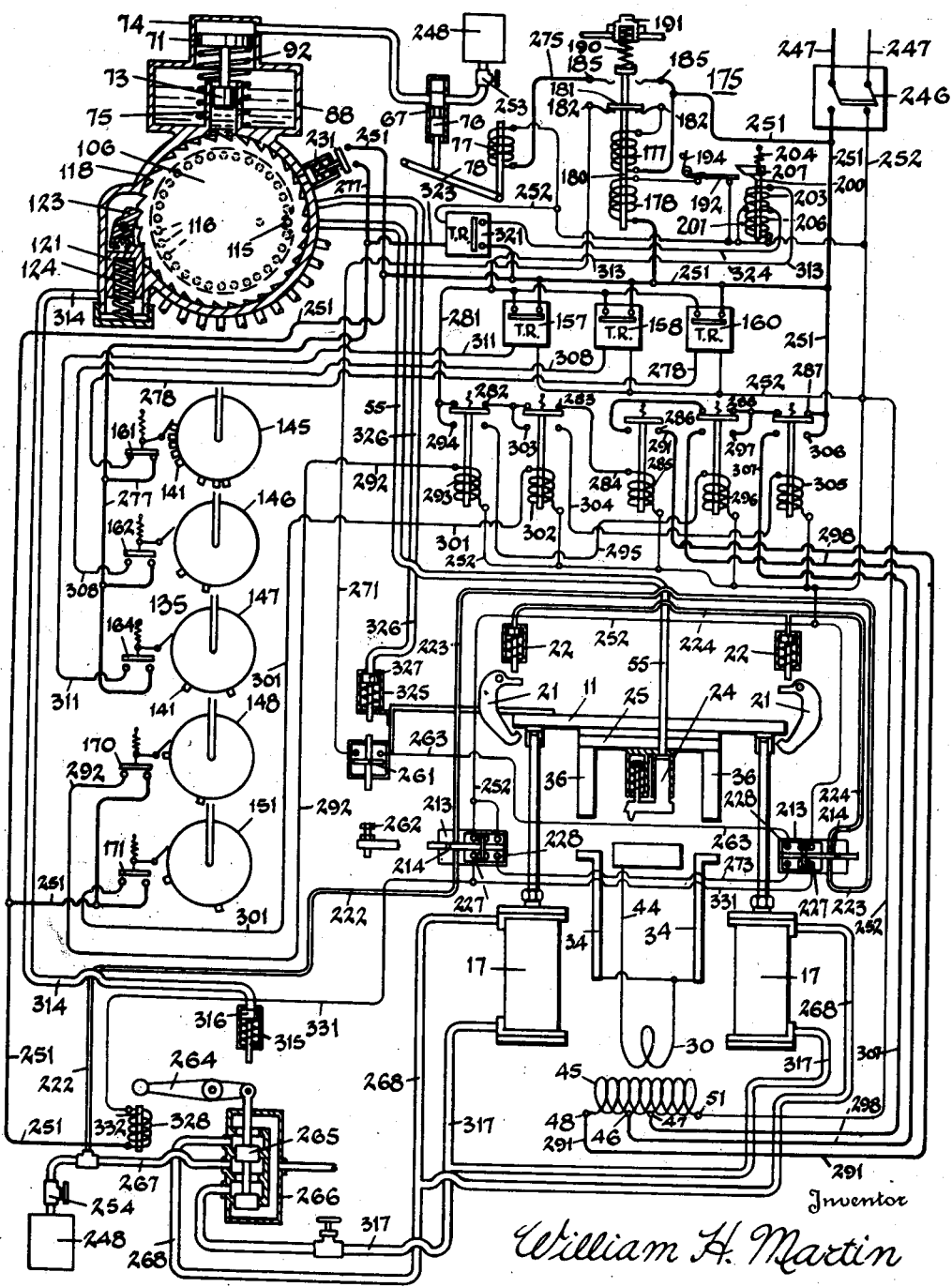

Patented Sept. 19, 1939

2,173,368

UNITED STATES PATENT OFFICE 2,173,368

WELDING MACHINE

William H. Martin, Pleasant Ridge, Mich.

Application November 15, 1937, Serial No. 174,581

13 Claims. (Cl. 219—4)

My invention relates to a multi-welding machine having a plurality of welders which may be caused to operate in succession to progressively weld the parts of the work. The invention provides means for producing welder pressure periods of desired length and the flow of a welding current of desired amperage within the said periods, and variation of the period length and amperage according to the physical or dimensional characteristics of the metal at the point or spot at which each of the welds are formed.

The invention particularly provides a combined fluid and electric control mechanism for controlling a plurality of welders to produce, sequentially, welding pressures and flow of welding currents having substantially any one of a plurality of predetermined amperages during any one of a plurality of periods of predetermined lengths and within welder pressure periods of corresponding lengths.

The invention also provides for the control of any number of welders for uniting metal structural parts and means for instituting each machine welding operation with the operation of the same individual welder, notwithstanding the number of welders used by the machine.

The invention also provides an electric pressure period control element having means for insuring rapid sequential circuit opening and closing operations immediately subsequent to the cessation of the periodic flow of the welding current and subsequent to the completion of the operations of the welders installed in the machine to quickly locate parts of the machine to initiate the subsequent machine operation.

The invention also provides a welding machine frame wherein supporting parts, in proximity to current conductor parts through which the welding current flows, are formed of rigid electric insulating material, such as wood, to reduce the high current losses ordinarily due to contiguity of large metal frames or bodies to the large conductors through which the alternating welding current flows.

The invention also has for its object to provide a multiple manual control whereby operators located at a plurality of positions, with respect to the machine and the work, may at any time cause cessation of the welding operation, for any reason, such as to correct any failure of any one of the welders to produce proper welds or to prevent creeping, not uncommonly occurring where large sheet metal parts are progressively spot-welded.

The invention also has for its object to provide reestablishment of the welding operations beginning with the welder, whose welding operation was prevented by reason of the manipulation of the control means to interrupt the welding operations.

The invention also provides automatic safety devices for preventing operation until requisite preceding operations of parts of the machine have been performed.

The invention consists in other features which will appear from the following description and upon examination of the drawings forming a part hereof. Structures containing the invention may partake of different forms and may be varied in their details and still embody the invention. To illustrate a practical application of the invention, I have selected a welding machine as an example of the various structures that contain the invention and shall describe the selected welding machine hereinafter, it being understood that certain features of my invention may be used to advantage without a corresponding use of other features of the invention and without departing from the spirit of the invention as presented in the claims. The particular structure selected is shown in the accompanying drawings.

Figure 2:
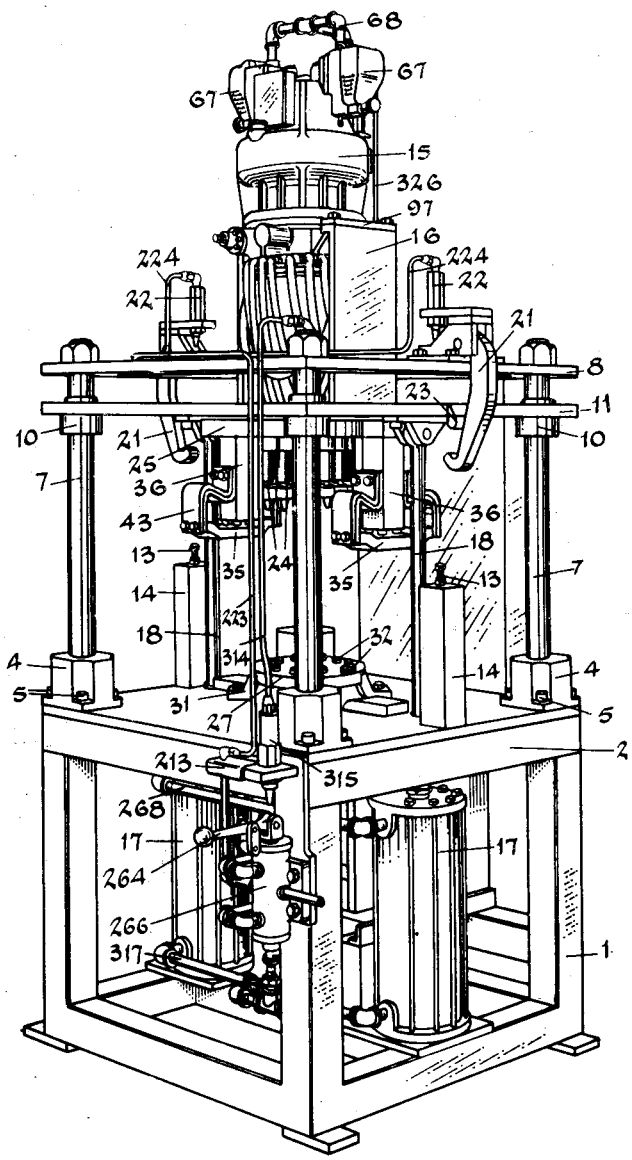
Figure 3:
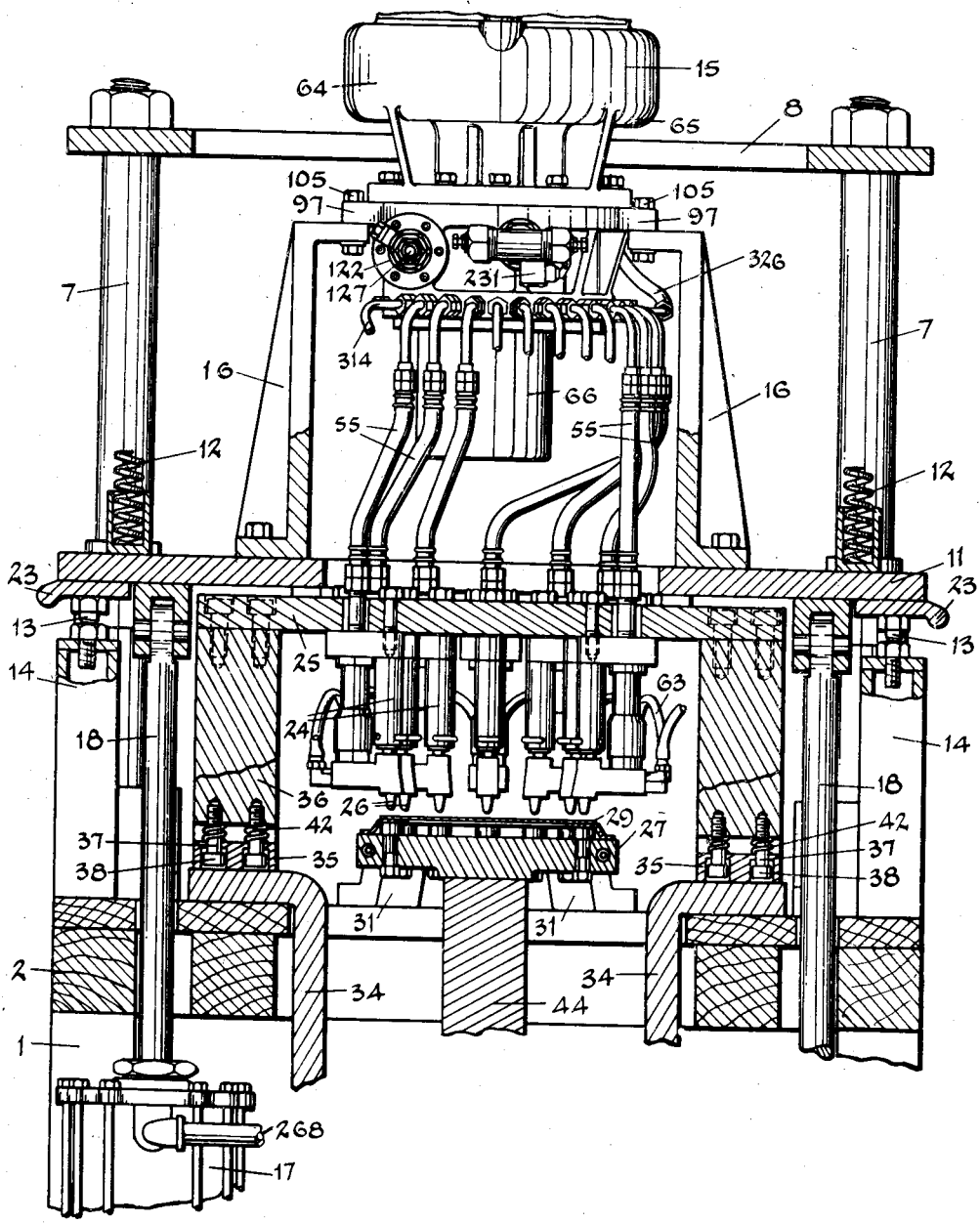
Figure 4:
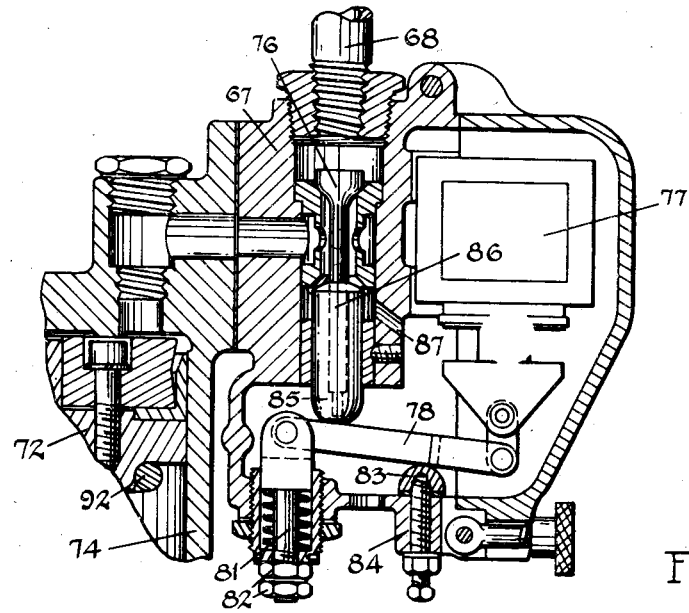
Figures 5, 6:
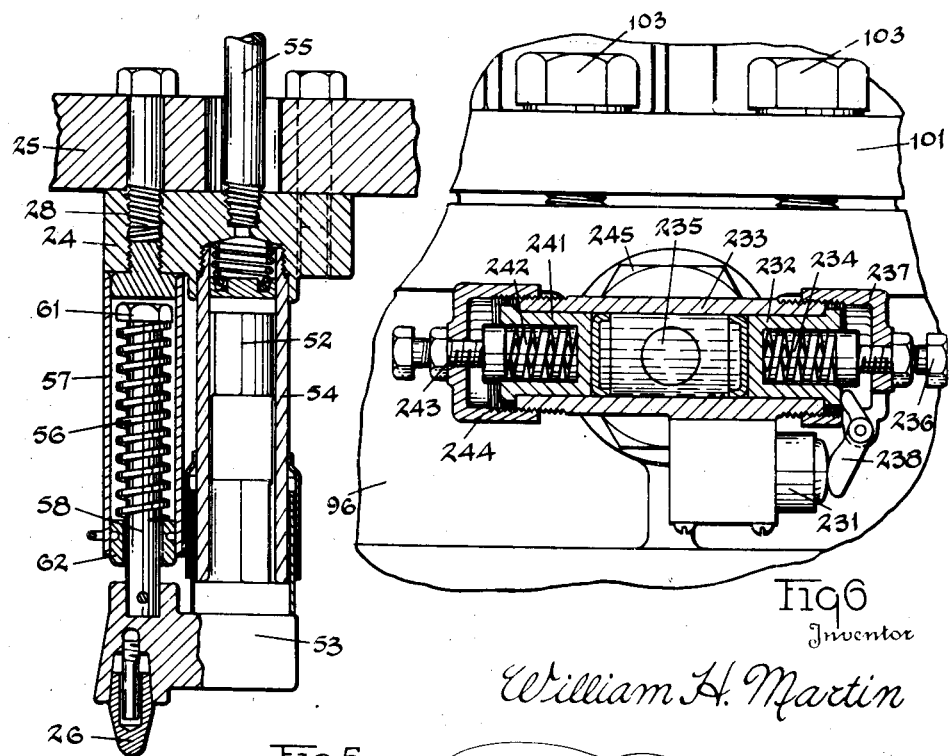
Figure 12:
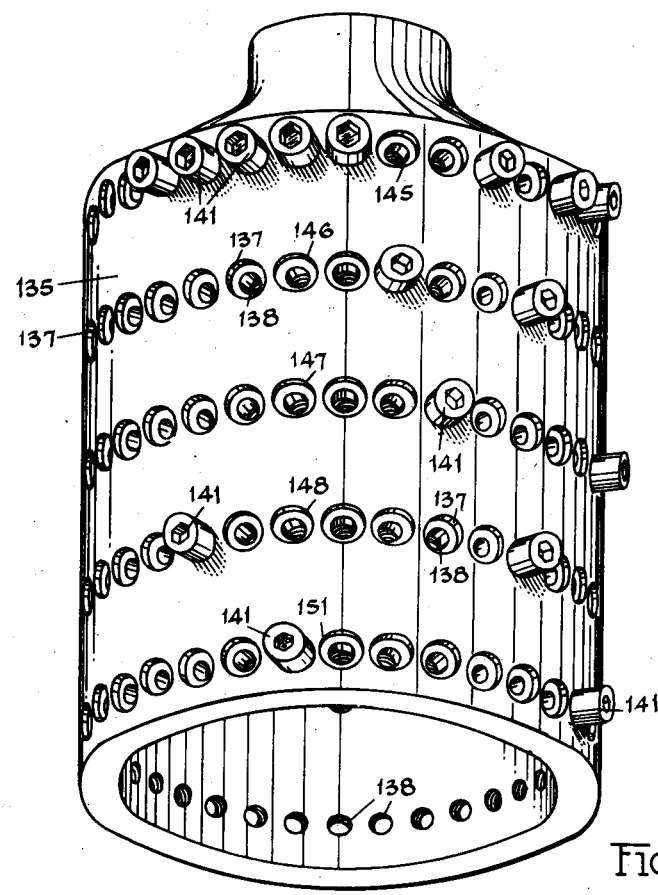
Figure 13:
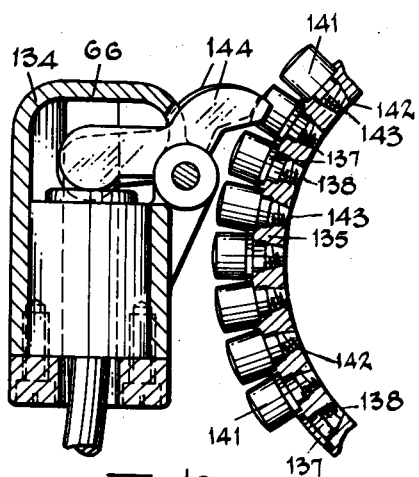
Figure 15:
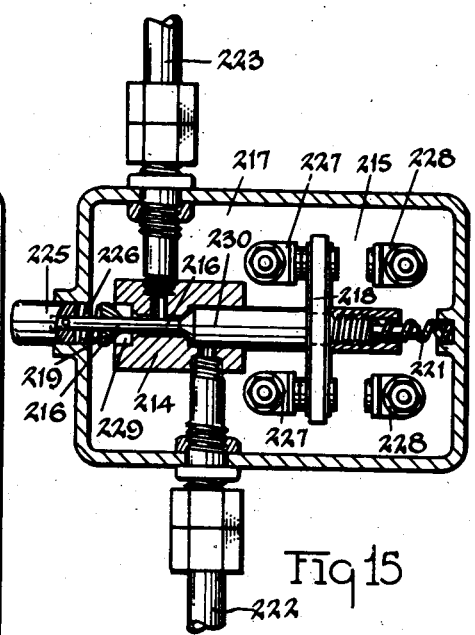
Figure 14:
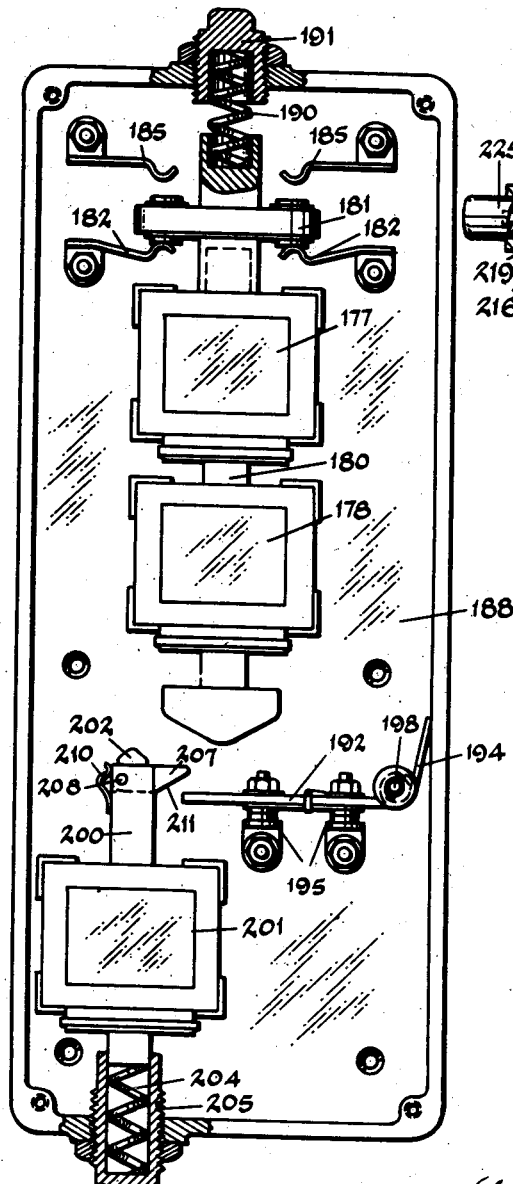

Fig. 1 is a front view of the machine. Fig. 2 is a perspective view of the machine showing the location of parts not shown in Fig. 1. Fig. 3 illustrates a section of a plunger of the machine showing the welders located contiguous to the work. Fig. 4 illustrates a fluid control valve for controlling the flow of fluid from a source of supply of fluid under pressure that operates the welders. Fig. 5 illustrates one of the welders that may be used in the machine. Fig. 6 illustrates a sectional view of a pressure switch for controlling the flow of the welding current and a pressure means for receiving liquid when the pressure increases above a welding pressure. Fig. 7 is an enlarged view of the head of the machine, parts of which are shown broken away to show a vertical section of a part of the head. Fig. 8 is an enlarged view of a side of the head of the machine showing control elements mounted thereon. Fig. 9 is a view of a section taken on the plane of the line 9—9 indicated in Fig. 8. Fig. 10 is a view of a section of a part of the head taken on the plane of the line 10—10 indicated in Fig. 8. Fig. 11 illustrates a view of a section of a part of the head taken on the plane of the line 11—11 indicated in Fig. 7. Fig. 12 illustrates a perspective view of a controlling drum for selectively causing desired welding pressure periods and flow of welding currents of desired amperages during the said periods. Fig. 13 is a view of a section of a part of the drum and illustrates one of a plurality of switches operated by parts located on the drum at predetermined points in its rotation. Fig. 14 illustrates a master control pressure switch for producing changes in pressure in the fluid control mechanism. Fig. 15 illustrates an operator's valve and switch control for initiating and stopping the operations of the machine. Fig. 16 illustrates diagrammatically the electrical and fluid connections between the parts of the machine.

In the form of construction illustrated in the drawings, the welding machine is provided with a frame 1 and a bed 2. The frame and bed are provided with large structural parts that are formed of material that is non-conductive to electric currents for preventing relatively large current losses that would otherwise occur where such parts are located in the vicinity of the large current conductors by reason of the alternations of the large currents and the rapid rate of change in the current flow due to the high frequency in which the circuit is opened and closed to produce the welds with great rapidity.

In the form of construction shown, the bed 2 is formed of wood. The bed is provided with large metal corner blocks 4 that are secured by bolts 5 to the frame 1. Guide rods 7 are secured in the blocks 4 and to a frame 8. Sleeves 10 are located on the rods 7 and are secured to a frame 11 that is slidably movable along the rods. Springs 12 may be suitably mounted on the frame 11 to engage and cushion the frame 11 as it is moved toward the frame 8. Suitable adjustment screws 13 located on posts 14, supported on the bed 2, limit the movement of the frame 11 toward the work. A welder head 15 is mounted on the frame 11 by means of brackets 16. The frame 11 may be also formed of wood or a composition material non-conductive of electric currents and sufficiently strong to sustain the working parts of the plunger or head and for preventing large current losses due to the proximity of the secondary terminals and the welders, through which the current flows, to the frame 11 when the frame is moved to a region in the vicinity of the terminals.

The frame 11 is shifted along the guide rods 7 by pistons located in the cylinders 17 and connected to the frame 11 by the piston rods 18. Dogs or latches 21 are pivotally suspended in suitable brackets located on the frame 8 for normally engaging lugs 23 located on the frame 11. The latches are pneumatically operated by spring-pressed pistons located in cylinders 22 to move the latches 21 with respect to the lugs 23 and permit the movement of the frame 11 past the latches in one direction and to engage the frame 11, if moved when the latches are in their normal engaging relation. The latches are controlled by one or more of the combined valve and switch controls shown in Fig. 15.

Any number of welders 24, within the limitations of the machine, are mounted on the frame 11. The welders may be mounted in any desired position with reference to each other to spot-weld pieces of work that conform to any desired shape. The points, or spots, of welding extend usually along definite lines. The lines may be broken or curved lines, means being provided for locating and securing the welders such that the pressures produced by the welders are exerted substantially in lines that extend at right angles to the plane of the surface parts of the work at the points at which the welds are formed. The welders are formed to have a considerable stroke and thus insure efficient welding operations under conditions where the work varies in its relation to the welders or where the welding points shorten due to continued use.

The welders may be secured to bars or a frame having curved or angular portions that roughly correspond to the contour of the work along the line of the welds in order to dispose the welders in proper welding relation with respect to the work. In order to closely locate the welding spots, the welders may be staggered as may be desired in order to locate the welding points 26 of the contiguous welders close to each other. Variation in the manner of mounting the welders may be made in order to adapt the welders to the shape of the work pieces that are to be welded together.

The part on which the work is supported may be likewise constructed in various forms to withstand the pressure of the welding points. Thus, the work supporting structure may be formed of current conductive bars or plates conforming to the shape of the work, particularly along the lines of the welds in order to sustain the work and the pressure of the welders.

In the form of construction shown in the drawings, the welders 24 are secured in heads 28 that may be bolted to a plate 25. The plate 25 is secured to the movable frame 11. The work 26 is supported on a die 27 connected to the other terminal of the secondary. The die 27 is supported on the bed 2 by the brackets 31. The die is, preferably, provided with studs 32 located in opposed relation to the welding points 26 of the welders 24. The studs 32 coact with the welding points to localize the pressure on the work and the flow of the current through the work as the work is spot-welded.

The transformer is mounted below the bed 2. The primary coil of the transformer is connected with a source of supply of electric current and the secondary consists of but one or two turns formed by a large low resistance conductor bar, or bar parts, formed of copper, or copper alloy, and located contiguous to or surrounded by the primary coil or divided parts thereof and in a plane parallel to the turns of the primary coil, whereby a large transforming ratio and consequently, a welding current of large amperage are produced.

The secondary 30 has a crossbar 33 and bars 34 are connected to the ends of the cross bar. The bars 34 form a divided terminal of the secondary 30. The bars 34 extend through the bed 2 and their end parts are, preferably, bent laterally and are contacted with elastically-pressed large blocks or contacts 35 that are supported on conductor bars 36 of large cross section and connected to the plate 25 on which the welders are mounted. The large contacts 35 are mechanically connected to the bars 36 by pins 37 that extend through the contacts and are provided with heads 38 (Fig. 3) that engage in recesses 41 formed in the contacts. The contacts are freely movable on the pins but their movements relative to the ends of the bars 36 are limited by the heads of the pins. Springs 42 are located on the pins intermediate the contacts 35 and the ends of the bars 36 for spring-pressing the contacts against the laterally extending end parts of the terminal bars 34. The contacts 35 are electrically connected to the conductor bars 36 by large laminated flexible conductors 43. The contacts 35 connect the welders to the divided terminal of the secondary when the welders are lowered to the die 27. The secondary, also, has a large bar 44 that is connected to the die 27. Thus, the bars 34 and the die 27 form the terminals of the secondary 30.

The primary 45 has two or more terminals 46 and 47 (Fig. 16) located intermediate the end terminals 48 and 51 of the coil and, preferably, near one of the end terminals, such as, the terminal 48. The terminals 46 and 47 divide the primary coil 45 into sections, each having as many turns as may be desired whereby one or more sections of the coil or the entire coil may be included and produce by induction in the secondary, flow of a welding current of different amperages through the welders 24 and the work 29.

The welder pistons 52 are provided with arms 53 that extend laterally from the axes of the cylinders 54 and pistons 52 (Fig. 5). The welding point 26 of each welder is located on the end of the arm 53 and ex-axially with respect to the piston to produce a torque on the piston to press the lateral surface of the piston 52 against the inner surface of the cylinder 54 when the welding point 26 is pressed against the work. The torque increases until the proper welding pressure is produced, whereupon the welding current is caused to flow through the plate 25, the cylinder 54, the piston 52, the welding point 26 and the work 29.

The welders are operated hydraulically, the welders being connected singly or in multiple to a liquid pressure means by pipes or branched pipes 55. The piston 52 of each welder is returned by a spring 56 when the pressure in the cylinder is sufficiently reduced. The spring 56 is located in a sleeve 57 and on a rod 58 that extends into the sleeve 57. The rod 58 is connected to the arm 53 at a point approximately in line with the welding points 26. The spring 56 is located intermediate the head 61 of the rod 58 and the plug 62 located in the end of the sleeve 57 to return the piston in the cylinder 54 when the hydraulic pressure, transmitted through the pipe 55, is reduced. The welding point 26 and the studs 32 may be water-jacketed to maintain these parts cool. Flexible pipes 63 inter-connect the relatively movable welder points to flow a cooling liquid in proximity to the points.

The welding pressures and the welding current that are transmitted to the welders, are controlled by a combined fluid and electric control mechanism 64, comprising the fluid control mechanism 65 and the electric control mechanism 66 (Fig. 7). The fluid control mechanism 65 involves fluid control means for controlling the flow of fluid from a source of supply of fluid under pressure to a combined pneumatic and hydraulic pressure means to produce alternate high and intermediate low hydraulic pressure periods, preferably, transforming the pneumatic pressure boosterwise into a much higher hydraulic pressure per unit of area, and a liquid control means for directing the transmission of the hydraulic pressure to the welders and other instrumentalities of the machine that perform cooperative functions.

A pair of valves 67, each connected to a source of supply of air under pressure by means of pipes 68, are supported on the head 15. The pulsating pressure is produced with considerable rapidity and a pair of valves is used to assure pneumatic connection, notwithstanding the rapidity with which they are required to operate. If desired, one of the valves may be used as an emergency valve when the other is used to normally control the fluid pressure. The head 15 is provided with a reciprocable piston 71 having a pneumatically operated piston part 72 and a hydraulic piston part 73 located, respectively, in cylinder parts 74 and 75. Each valve 67 has a movable valve member 76 for admitting air under pressure to the cylinder part 74 and exhausting the air therefrom to produce the pulsating fluid pressures. Preferably, the pneumatic cylinder and piston parts have a diameter larger than the diameter of the hydraulic cylinder and piston parts for boosting or raising the pressure per square inch exerted by the pneumatic parts to produce a hydraulic pressure greatly in excess to the pneumatic pressure.

Each valve 67 is electromagnetically actuated by a solenoid 77 and lever 78 (Fig. 4). The lever 78 is fulcrumed on an adjustable spring-pressed pin 81 which has a suitable bifurcated end part for receiving the end of the lever and its pivot pin for pivotally supporting the lever. The fulcrum pin 81 may be adjusted by suitable nuts 82 to adjust the lever relative to the movable valve member 76 to regulate the extent of opening of the valve. A lever limiting stop 83 is located on the adjustment screw 84 and is disposed to engage the lever as it moves to close the valve. The movable member 76 of the valve is provided with a stem 85 having an enlarged portion 86 that seats to close the outlet 87 when the valve member 76 is moved from its seat to open the valve. The air is exhausted from the cylinder part through the outlet passageway 87 when the valve is closed which releases the pneumatic and hydraulic pressures.

The hydraulic cylinder part 75 is surrounded by a reservoir 88 (Fig. 7) containing a liquid, preferably oil, and is connected with the interior of the hydraulic cylinder part 75 through an opening 91 located at a point just below the lower end of the hydraulic piston part 73 when the piston 71 is located in its uppermost position. The reservoir 88 has a gauge 93 and may be filled through a spout 94 to a desired level. When the valve is closed and the fluid pressure released, the piston 71 is returned by the spring 92. When the piston 73 descends, it closes the opening 91 and entraps the oil in the spaces that communicate with the hydraulic cylinder part 75 and, thus, transmits, hydraulically, the high pressures produced by the piston 71 to actuate the pressure elements connected with the hydraulic cylinder part.

The hydraulic cylinder part 75 is connected to an indexing valve 95 for directing the transmission of the pressure hydraulically to the welders, and control elements that control certain operations of the machine. The indexing valve 95 has a shell 96 that is provided with an outwardly extending flange 97 and the lower end of the hydraulic cylinder part 75 terminates in a flaring wall 98 that forms a bottom part of the reservoir 88 and a flange part 101 that extends laterally from the flaring wall 98. A gasket 102 is located intermediate the edge of the shell 96 and the lower end edge of the flaring wall 98. The flanges 97 and 101 are bolted together by the bolts 103 for connecting the cylinder part 75 to the shell of the indexing valve and compressing the gasket 102 to seal the connection between the lower end of the cylinder part and the shell and at the same time form a pressure chamber 104 of the indexing valve 95. The flange 97 is also connected by the bolts 105 to the brackets 16 for supporting the head 15 on the frame 11.

The pressure chamber 104 has a rotatable valve part 106 which is connected to a shaft 107 located in the bottom wall 108 of the shell 96. The rotatable valve part is slidably supported on the wall 108. The opposed portions of the valve part 106 and the wall 108 are recessed to greatly reduce the contacting areas and the frictional resistance to rotation and form an annular low pressure chamber 111. The chamber 111 communicates with the reservoir 88 by the pipe 112 to enable free gravity filling of the welder cylinders and the communicating passageways and chambers of the elements operated by the fluid pressure mechanism, with the oil from the reservoir, and, under certain conditions, to enable return of the oil to the reservoir.

The valve member 106 is provided with a boss 113 (Fig. 9) that extends from a marginal rim 114 into the low pressure chamber 111. The boss is provided with an opening or port 115 that is located within the area defined by the rim 114. The bottom wall 108 of the shell 96 has a plurality of passageways 116 extending therethrough. The inner ends of the passageways are located in sequential registrability with the port 115 as the valve member is rotated but normally communicate with the low pressure chamber 111. The pipes 55 are connected to the passageways 116 and are sequentially connected with the high pressure chamber by the port 115 in the movable valve part 106. The pipes 55 are also connected to the welders 24 and other of the machine control elements. Thus, the high pressure chamber 104 may be connected to the welders, singly or in multiple, sequentially, and to control elements in sequential relation.

The indexing valve 95 is provided with a means for operating the rotatable valve part 106 step by step to cause sequential registration of the port 115 with the passageways 116 during the low pressure periods to enable transmission of the high pressure during the immediate subsequent high pressure periods.

In the form of construction shown in the drawings, the rotatable valve member 106 is provided with as many ratchet teeth 118 as there are passageways 116. The teeth are peripherally disposed over the entire edge of the valve member. A piston 121 is located in a cylinder 122 that extends tangentially from the shell 96. The piston extends into the pressure chamber 104 and is moved by the pressure of the liquid during the high pressure periods for producing step by step movement of the movable valve member to produce sequential connection of the port 115 with the passageways 116 to connect the welders to the pressure chamber 104. Where the number of welders 24, singly or in multiple, are less than the number of passageways, the passageways not used or connected to welders or other pressure operated elements of the machine may be plugged, the machine, however, being provided with means for causing the production of the periodic changes in pressure in the pressure chamber 104 to cause the piston 121 to step the movable valve member 106 through a complete cycle of its movement. A spring-pressed dog 123 is located on the end of the piston. The piston 121 is formed hollow and a spring 124 is located within the piston 121 and intermediate a closed end part of the piston and the plug 125 that closes the end of the cylinder 122. The plug 125 may be provided with a hollow pin 126 that seats upon the plug 125. The pin has a flange part that is engaged by the lower end of the spring 124. A hollow threaded pin 127 extends through a tapped central opening of the plug 125 and engages the lower end of the pin 126. The pin 127 may be rotated to adjust the tension of the spring 124. The outwardly extending end of the cylinder 122 is connected by a pipe 128 with the reservoir 88 to which any oil that may leak past the piston will be returned. The spring 124 is compressed during the pressure periods by the pressure on the closed end of the hollow piston 121 which moves the dog 123 to a point to engage a succeeding tooth 118 of the movable valve member 106 preparatory to moving the valve member succeeding steps during the following low pressure periods by the pressure of the spring 124 when the frictional resistance to the movement of the valve member is practically nil.

The indexing valve may be provided with a means for securing the piston 121 to prevent its movement. The piston 121 has a shouldered part 131 (Fig. 11) and the cylinder 122 has a shouldered part 132. The end part of a screw 133, that extends through the wall of the cylinder, may be located against the end of the piston 121 to lock the shouldered part 131 on the shouldered part 132 of the cylinder and enable testing of the individual connections of the welders and other control elements with the pressure chamber 104 by repeated operations of the piston 71.

The electric control mechanism 66 forms a part of the head 15 of the machine. It comprises a plurality of switches located in a suitable shell and means for selectively operating the switches. Preferably, the switches are operated during the low pressure periods and perform, in some instances, their resultant controlling functions during both the low and immediately following high pressure periods and, in other instances, during the high pressure periods only. The electric control mechanism 66 has a drum which is connected to the movable valve member 106 of the indexing valve, and, therefore, moves in unison with the movement of the movable valve member during the low pressure periods to perform its controlling functions.

The drum 135 is connected by the bolt 136 to the shaft 107 of the movable valve member and is provided with a plurality of recesses 137 (Fig. 12) arranged in rows extending parallel to the axis of the drum and circularly about the axis. The recesses have tapped openings 138 that extend through the bottoms of the recesses 137 and nobs 141 having hubs 142 and threaded studs 143 are secured in the recesses 137 and protrude from the exterior surface of the drum to operate camwise on a plurality of levers 144 that are supported on a common pivot pin having an axis extending parallel to the axis of the drum 135. The switches operated by the levers are located in the shell 134. The ends of the levers are located in proximity to the surface of the drum and in the planes of the circularly disposed rows 145, 146, 147, 148 and 151 of the recesses and are operated by the nobs 141 according to their location in the rows. There are as many rows of recesses extending parallel to the axis of the drum as there are passageways 116 in the shell 96. Also, there are as many teeth 118 on the movable valve member 106 to which the drum is connected as there are passageways 116. The drum is connected to the valve member to dispose the said rows in a defined relation with reference to the port 115 to produce switch operations by one or more of the levers 144 during the low pressure periods and cause the performance of the functions of certain electrically controlled devices of the machine upon their connection with the pressure chamber through the port. Thus, nobs 141 may be disposed in the same circular rows to cause the sequential operation of any of the electric instrumentalities of the machine or, where certain of the instrumentalities produce similar functions, the particular function may be selectively produced by locating the nobs in different circular rows. Also, the nobs may be located in vertical disalignment to prevent operation of two or more similarly functioning instrumentalities at the same time. Also, where certain instrumentalities are required to cooperate to produce a desired result or to coact to produce desired results, they may be caused to operate cooperatively or coactively by the location of nobs in different circular rows but in the same vertical rows to actuate certain of the levers 144, simultaneously. Thus, any desired results may be obtained in the operation of the machine by the arrangement of the nobs on the drum.

The machine is provided with a plurality of period control switches each having means for adjusting the period during which a switch will be retained closed subsequent to the closure of the switch, and automatic means to open the circuit thus closed by the switch at the expiration of the said period, or vice versa as to opening and closing the switches, such as time relays of the form well known in the art. Thus, the time relays 157, 158 and 160 (Fig. 16) are controlled, respectively, by the switches 164, 162 and 161 which are, respectively, operated by the nobs in the circular rows of recesses 147, 146 and 145. The time relays control the pressure periods produced by the fluid control mechanism 65, as described hereinafter. The connection of the outer terminal 51 of the primary with the main line switch of a source of supply of electric current is permanent and the connection of the other terminals of the primary is dependent upon operation of either of the switches 170 or 171. The connection of the terminals 46 and 47, of the primary 45, to the source of supply, are controlled, respectively, by the switches 170 and 171 which are operated by the nobs located in the rows of recesses 148 and 151, respectively. Thus, the current from the source of supply may be directed either through all the turns of the coil or through the turns between one or the other of the terminals 46 or 47 and the terminal 51 and produce a flow of welding current having a desired predetermined amperage, as described hereinafter.

The time relays 157, 158 or 160 control a master pressure control switch 175 which controls the valve 67 to produce controlled pulsating hydraulic pressures.

The master control switch, shown in Fig. 14, has a pair of solenoids 177 and 178 that, when energized, cooperate to actuate a spring-pressed core 180 to a certain circuit-closing position, neither of the solenoids 177 or 178 having, however, sufficient number of turns to produce the required field to independently actuate the core 180. Thus, when one of the solenoids, such as the solenoid 178, is energized alone, the core will not be actuated, but the solenoid will maintain the core 180 in the said certain circuit-closing position to which it has been previously moved when both of the solenoids were energized, and when both of the solenoids are de-energized, the core will move from one circuit-closing position to another circuit-closing position.

The core 180 operates a movable contact 181 which alternately completes a circuit through the yielding contacts 182 or 185. The solenoids and the contacts are supported on the bottom of a suitable shell 188 that encloses the switch, and a spring 190 is interposed intermediate an adjustment thimble 191 that may be located in an end wall of the shell 188, and the bottom of a socket formed in the end of the core 180. The spring 190 may be adjustably tensioned to resist the movement of the core 180 in its movement to close the contacts 185 by the solenoids 177 and 178 and to permit closure when both solenoids are energized sufficiently to give the core momentum to move from one pair of yielding contacts to the other pair and also to permit retention of the closure when one solenoid alone is energized and open the circuit when both of the solenoids are de-energized. The spring 190, and also, if desired, the weight of the core 180, biases the core to close the circuit through the contacts 182.

The master pressure control switch 175 is, also, provided with means for opening the circuit of a solenoid which operates as a switch retaining and cooperative switch closing means. In the form of construction shown, the master pressure control switch is provided with an auxiliary switch 192 (Fig. 14) which is biased by a spring 194 to a circuit-closing position with reference to the fixed contacts 195. The switch 192 is pivotally supported by a pin 198 secured in the bottom wall of the shell 188, and the spring 194 engages a side wall of the shell and extends spirally around the pin 198 and engages the movable switch to bias the switch to close the circuit of the solenoid 178, which is connected to one of the contacts 195.

The switch 192 may be opened by the operation of a core 200, movable within a solenoid 201, and actuated thereby. The core 200 is limited in its movement by a stop 202 located on the bottom of the shell 188 and is biased resiliently toward the stop 202 by means of the spring 204, which is located in the threaded thimble 205. The thimble 205 may be adjusted with respect to the shell to adjust the tension of the spring 204. The end of the core 200 is provided with a dog 207 located in a suitable slot formed in the end of the core 200 and pivotally connected by a pin 208 to the core to form a knife-blade joint. The dog 207 may be spring-pressed, by means of a suitable spring 210, to normally protrude laterally from the core 200. One side surface of the dog 207 may be provided with an inclined edge 211 so that, upon descent of the core 200, produced by energization of the solenoid 201, the dog will readily pass the end of the switch 192, but when the solenoid 201 is de-energized, the core 200 will be moved by the pressure of the spring 204 to open the switch 192 and, thus, de-energize the solenoid 178. The movable contact 181 is then moved under the tension of the spring 190 to close the contacts 182. When the solenoid 201 is again energized, the dog 207 passes the switch 192 without operating it, and when the circuit through the solenoid 177 is closed, the master control switch will again be operated to close the switch through the contacts 185.

If desired, the switch-operating solenoid 201 may be operated by any one of a plurality of circuit-closing means which may or may not be dependent on the operations of the master pressure control switch but which produces some desired result. Thus, the solenoid 201 may be connected to a plurality of circuit-closing means or, if desired, the solenoid may be subdivided and provided with a central terminal, or the solenoid may be formed of two or more coils in circuits that, for efficiency of operation, should be kept separate and may thereby be used conjointly as when the desired closure of the master pressure switch is to be subject to the performance of two prerequisite conditions and it is desired to close the master pressure switch upon fulfillment of both or either one of two such conditions. In the particular form of construction shown in the drawings, the solenoid 201 is formed of two coils (Fig. 16) 203 and 206, either of which, when energized, will actuate the core 200 and position the dog 207 for opening the switch 192. When the coil or coils of the solenoid 201 are de-energized, the core 200 is released and the dog is operated to open the switch.

The operations of the master pressure switch may be controlled by any sequential operations of one or two elements or any suitable timing device operating through the solenoids 177 and 178 of the master pressure control switch and the solenoid 201 of the auxiliary switch 192 and without the use of regulated pneumatic dash pots which invariably clog in the restricted passageways or the use of liquid dash pots which invariably have frictional resistance to free movement of the core that, under many different circumstances, is required.

The machine shown in the drawings is controlled, preferably, by two or more combined valve and switch controls, whereby the machine may be stopped in its operation at any time and the frame 11 may be raised. Preferably, the controls are spring-pressed to return the controls to normal position and, thus, require that the controls be manually moved and held during the operation of the machine and, when released, any one of the controls operates automatically to stop the machine. This provides a means whereby the operation of the machine may be stopped for any reason by any one of a plurality of operators that are located in positions to closely watch the progress of the machine in its welding operations.

The combined valve and switch controls 213, shown in Fig. 15, control fluid pressure in parts of the machine and also electric elements that control the operation of other elements of the machine necessary for causing initiation or cessation of the welding operations of the machine at any time to prevent imperfect welding operation and also as a safety means for the protection of the operators and the machine. The controls are each provided with a valve 214 and a switch 215 that are mounted in a suitable shell 217. The movable switch member 218 is connected to the movable valve part 230 and they are both biased normally to closure of the valve and one of the circuits by means of the spring 221. The valve 214 is provided with a pair of pipes 222 and 223 through which air may be directed by the valve. The valve is provided with a suitable handle or push button 225 which may be operated to press the spring 226 and, through the pressure of the spring, to close an exhaust port 229 by a valve part 219 slidably located on a pin 216. The spring 226 is located on the pin 216 and intermediate the push button 225 and the valve part 219. The pin 216 telescopes within the push button 225 and is connected to a valve part 230 and is engaged by the button to first close the valve part 219 and open the valve part 230, which connects the pipe 223 with a source of supply through the pipe 222 and, upon release of the push button 225, the pressure of the spring 221 disconnects the pipe 223 and the pressure of the air in the pipe 223 opens the valve part 219 to exhaust the air from the pipe 223 and the pneumatic elements that may be connected to the pipe 223. The movable switch member 218 is connected to the valve part 230 and the switch member 218 will likewise be operated by continued inward movement of the push button to open a circuit through the fixed contacts 227 and to close a circuit through the fixed contacts 228. When, however, the pressure of the operator on the push button 225 is released, the electric circuit through the contacts 228 will be opened, the valve 214 will be closed and the electric circuit through the contacts 227 will be closed and the valve part 219 will be opened to cause the operation of elements of the machine as described hereinafter.

The machine is provided with a pressure control switch that communicates with the pressure chamber 104 for closing a circuit when the pressure of the chamber is sufficient to produce a welding pressure in the cylinder of the welder that is connected to the pressure chamber through the port 115. The pressure switch 231 (Fig. 6) is operated by a hollow piston 232 located in the cylinder 233 which is mounted on the wall of the shell 98 of the indexing valve 95. The movement of the piston is counteracted by the spring 234 which is located in the piston 232 and intermediate the bottom of the piston 232 and a screw 236 located in the cap 237 that covers one end of the cylinder. The screw may be turned to adjust the tension of the spring 234 to prevent operation of the switch 231 until the pressure in the communicating passageway 235 that connects the cylinder with the pressure chamber 104 reaches a pressure such as to produce a welding pressure in the welders as they are connected to the pressure chamber. The movement of the piston 232 is transmitted to the switch 231 by the lever 238 which extends within the cap 237 and is pivotally supported on the cap. The cylinder 233 is also provided with a counteracting pressure piston 241 whose movement is yieldingly resisted by the spring 242, located intermediate the end of the piston 241, which is formed hollow, and a screw 243 located in the cap 244. The screw 243 may be rotated to adjust the pressure of the spring 242 to yieldingly resist the movement of the oil from the pressure chamber 104 into the cylinder 233 as the pressure rises materially above the welding pressure subsequent to the operation of the piston 232 and the switch 231. Thus, the piston 241 operates to enlarge the total volume of the spaces communicating with the pressure chamber of the indexing valve. The piston 241 counteracts the pneumatic pressure and maintains substantially a constant pressure that is higher than the welding pressure as the pressure on the piston 73 increases.

In the diagrammatic illustration shown in Fig. 16, parts of the machine are electrically connected by means of a switch 246 to a source of supply of electric current, which may be indicated by the main lines 247, and parts are connected to a source 248 of supply of fluid under pressure, which is indicated at two points for convenience of diagrammatic connection of the source of supply of fluid with instrumentalities shown in upper and lower parts of the figure. The switch 246 connects the main lines with what may be referred to as the supply line 251 and to the return line 252 that directly or indirectly connect the electrically operated elements of the machine to the switch. The parts of the work 29 to be welded together are placed on the die 27 of the secondary 30, or otherwise connected to the terminal. The welders of the machine may be operated, singly or in multiple, sequentially, and each set of welders, when operating in multiple, may be connected through a branch pipe to one of the passageways 116 to produce simultaneous operation of the welders of each set. Due to the rapidity of the sequential operation of the welders, two or more operators are usually required to operate the machine. The machine shown in the drawings is controlled by two operators' combined controls 213.

Previous to starting of the welding operations of the machine, the combined fluid and electric control mechanism 66 has been positioned to coact with other elements for starting the machine. When the valves 253 and 254 of the source 248 of supply of air under pressure are opened and the main line switch 246, which connects the source of current to the supply line 251 and return line 252, is closed, the operation of the machine is initiated by the operation of the two combined valve and switch controls 213. The valve parts 214 direct the flow of the air under pressure from the source 248 through the valve 254 and pipe 222, one of the valves 214, the pipe 223, the other valve part 214 and a pipe 224 to the cylinders 22. The switch parts 215 operate to close part of the circuit that is subsequently completed by the switch 261 mounted on the head 15 (Fig. 8) of the machine when it engages the screw 262 mounted on the frame 8, as the frame 11 nears the limit of its movement toward the work 29. The switch parts 215 connect the switch 261 through the lines 263 and 273 to the return line 252. The pressure in the cylinders 22 operates the safety-engaging hooks 21 to permit the descent of the frame 11, on which are mounted the welders 24 and the fluid and electric current control mechanism 64. The lever 264 is then operated by one of the operators and the movable valve member 265 of the valve 266 will connect the ends of the cylinders 17 with the source of supply of fluid through the valve 254, the pipes 267 and 268 to move the frame 11 until the welders are in position to engage the work. When the frame 11 approaches this point, the switch 261 is closed by its engagement with the head of the screw 262. The switch 261 initiates the operations of the combined fluid and electrical control mechanism 64 by completing a circuit from the supply line 251, through the solenoid 177 of the master pressure control switch 175, the contacts 182, the line 271, the switch 261, the line 263, one of the switch parts 228, the line 273, the other of the switch parts 228, to the return line 252; the solenoid 178 being connected in the circuit from the supply line 251, the solenoid 178, the switch 192, to the return line 252.

The solenoid 177, operating in conjunction with the solenoid 178, causes the movable contact 181 of the master pressure control switch 175 to open the circuit through the solenoid 177 and the yielding contacts 182, which de-energizes the solenoid 177, and complete the circuit of the solenoid 77, by its momentum and operation of the solenoid 178, from the supply line 251, through the yielding contacts 185, the line 275, to the solenoid 77, the solenoid 77 being connected to the return line 252, the circuit through the solenoid 77 being retained closed by the solenoid 178, against the bias of the spring 190, until its circuit is opened. The solenoid 77 operates to open the valve 67 to connect the cylinder part 74 with the source 248 of supply of fluid through the valve 253 and operate the piston 71 and produce a high pressure in the pressure chamber 104 that is transmitted through the liquid of the fluid control mechanism 65 to the welders and other pressure elements having chambers or passageways communicating therewith.

The high pressure quickly develops a welding pressure in the cylinder of the welder connected to the chamber 104 through the port 115 and the pressure closes a switch 231 that initiates operation of the electric elements to produce a welding current of desired amperage to flow a desired period. Assuming that the time relay switch 161 associated with the time relay 160, has been previously closed in the preceding low pressure period, the switch 161 connects one contact of the switch 231 with the relay 160 through the lines 277 and 278, the other contact of the switch 231 being connected with the supply line 251. The switch 231, when closed by a pressure sufficient to produce a welding pressure in the welder connected through the port 115 to the high pressure chamber, connects the relay 160 in the circuit from the supply line 251, the switch 231, the line 277, the switch 161, the line 278, to the relay 160, which is connected to the return line 252. The relay 160 connects the supply line 251 through the relay 160, the line 281, the switches 282 and 283, the line 284, and the solenoid 285, which is connected to the return line 252. The solenoid 285 closes the switch 286, which closes the circuit from the supply line 251, through the switches 287 and 288, to the line 291, which is connected to the outermost terminal 48 of the primary coil 45, through the coil 45, the terminal 51, to the return line 252, which produces the flow of a welding current of maximum amperage for the period determined by the setting of the time relay 160.

When the period of time, as controlled by the adjustment of the relay 160, has expired, the circuit to the primary coil 45 is opened and also the circuit through the coil 203 of the solenoid 201 is opened which operates to release the core 200 and open the switch 192 and thus open the circuit of the solenoid 178 and the master switch opens the circuit of the solenoid 77 which closes the valve 67 and releases the piston 73 and the welding pressure on the work. This occurs immediately subsequent to the opening of the circuit of the primary coil and the discontinuance of the flow of the welding current.

Where it is desired to produce the flow of current less than a maximum for the period as determined by the adjusted setting of the relay 160, the switch 170 and the time relay switch 161 are operated simultaneously during a low pressure period to establish connection of the time relay switch 160 with the pressure switch 231 and connection of the relay 160 with circuits that will connect the terminals 46 and 51 of the primary with the supply line 251 and the return line 252, respectively. Also, if it is desired that a current of still smaller amperage is to flow during the period as controlled by the relay 160, the switch 171 is operated simultaneously with the relay switch 161 to establish a circuit of the time relay 160 which will, when operated, connect the terminals 47 and 51 of the primary 45 with the supply and return lines 251 and 252.

Assuming that the switch 170 has been operated by one of the nobs 141 in the recesses of the row 148 during a low pressure period, the switch 170 establishes a connection from the supply line 251, through the switch 170, to the line 292, through the solenoid 293, to the return line 252. The solenoid 293 operates to open the switch 282 and close the switch 294. When the pressure switch 231, during the subsequent high pressure period, is operated to complete the connection through the relay switch 161 to the relay 160, the relay 160 operates to complete a circuit from the supply line 251, to the line 281, through the switch 294, the line 295, through the solenoid 296, to the return line 252. This operates to open the switch 288 and connect the supply line 251 through the switch 287, the switch 297, to the line 298, to the terminal 46 of the primary 45 and cause the current to flow through the turns of the coil of the primary located intermediate the terminal 46 and the terminal 51 to the return line 252. The primary 45 will induce a welding current in the secondary 30 having corresponding decrease in amperage which will flow during the period determined by the adjustment of the relay 160. The time relay then causes the operation in other circuits to produce discontinuance of the pressure period as described above.

When it is desired to cause the flow of a welding current having a still smaller amperage for the period of time as controlled by the time relay 160, the turns of the primary coil 45 between the terminals 47 and 51 are connected, respectively, to the supply line and the return line by the operation of the switch 171 that may be operated during a low pressure period by one of the nobs 141 located in one of the recesses of the circular row 151 at the same time that a nob in the row 145 operates the relay switch 161 which controls the circuit from the supply line 251 to the relay 160, as described above. The switch 171 completes the circuit during the low pressure period from the supply line 251 through the switch 171, the line 301, through the solenoid 302 which is connected to the return line 252. The solenoid 302 operates to open the switch 283 and close the switch 303 which completes a circuit from the relay 160, through the line 281, the switch 282, the switch 303, the line 304, through the solenoid 305, to the return line 252. During the following high pressure period, the operation of the time relay 160 is again initiated in its operation by the pressure switch 231 and a current flows through the solenoid 305 to open the switch 287 and close the switch 306 which connects the supply line 251 through the line 307 to the terminal 47 and through the turns of the primary coil 45 located intermediate the terminal 47 and the terminal 51 to the return line 252. Consequently, a welding current of still smaller amperage is induced in the secondary 30 and will flow for the same period as controlled by the time relay 160 in forming the weld. The time relay 160 again terminates the pressure period, as described above.

When the circuits of either of the time relay 157 or 158 are established by an associated time relay switch, either 164 or 162, and the pressure switch 231 is operated, the current will be completed to either of the relays in the same manner and the welding current will flow during the periods for which the relay is set, having amperages that correspond to the number of turns that are located between the terminal connected to the return line 252 and any one of the three terminals 48, 46 and 47, as determined by the operation or non-operation of the switches 170 and 171 in the same manner that the time relay 160 controlled the period of flow of the welding current, as described above, the time relays being connected in parallel with the supply line 251 and the line 281. Consequently, the flow of the current to the terminals of the primary coil 45 will depend upon the energization of the solenoids 285, 296 and 305 which are dependent upon the operation of the solenoids 293 and 302 that are controlled by the switches 170 and 171.

Where it is desired to cause the flow of a welding current during the period at which the relay 158 is set, the switch 162 is operated during the low pressure period by a nob 141 located in the row of recesses 146 which operates to connect one terminal of the pressure switch 231 with the time relay 158 by the line 277, the relay switch 162, the line 308, the relay 158 to the return line 252 and when the pressure switch 231 is operated, the time relay 158 is connected to the supply line by the pressure switch 231 and upon expiration of the time, as determined by the setting of the time relay 158, the same connections are established by the time relay 158 to terminate the pressure periods that were established by the relay 160 for that purpose, as described above.

When the relay 157 is to be used to control the period of flow of the welding current, the switch 164 is operated during the low pressure period to complete one terminal of the pressure switch 231 through the line 277, the switch 164, the line 311, the relay 157 to the return line 252, the other terminal of the pressure switch 231 being connected to the supply line 251. The operation of the relay 157 is initiated when the pressure switch 231 is operated during the high pressure period.

The relay 157 completes a circuit from the supply line 251, the relay 157, the line 281, switch 282, the switch 283, the solenoid 285 to the return line 252. A circuit is then completed from the supply line 251, the switches 287, 288 and 286, to the line 291, the terminal 48 of the primary 45, and the terminal 51 of the return line 252.

During the operation of any one of the time relays 157, 158 and 160, a current is not only established through one or the other of the solenoids 285, 296 or 305, but also from the line 281 through the coil 203 of the solenoid 201 which operates to draw the core 200 and move the dog 207 below the switch 192 and, upon the termination of the flow of the current, through the line 281 by the operation of any one of the time relays, the flow of current from the line 281, through the line 313, the coil 203 to the return line 252 is discontinued and the core 200 is operated by the tension of the spring 204 to open the switch 192 and de-energize the solenoid 178. The movable contact member 181 opens the connection between the contacts 185 which breaks the circuit from the supply line 251 through the solenoid 77 to the return line 252 and the valve 67 is closed which immediately releases the pressure in the pneumatic cylinder part 74 and the piston 71 is returned by the spring 92 and the subsequent low pressure period is produced and the pressure chamber 104 is connected to a welder, to be operated during the succeeding pressure period through the port 115, and its related pipe 55.

Immediately upon the return of the movable contact member 181 by the operation of the spring 190, the contacts 182 are closed and the solenoid 177 is again energized, the solenoid 178 being also energized by the connection from the main supply line 251, through the solenoid 178, to the switch 192, to the return line 252, the contacts 185 are again closed by the movable contact member 181 which again closes a circuit from the supply line 251, through the contacts 185, the line 275, the solenoid 77 to the return line 252 which again operates the valve 67 and connects the pneumatic cylinder part 74 with the source of supply of air under pressure and the high pressure period is again initiated resulting in the operation of one of the relays and the connection with the desired primary terminals is established to produce the flow of a welding current of a desired amperage for a desired period in the production of the weld by the succeeding welder that has been connected by the indexing valve 95 during the next preceding low pressure period and the high pressure period is terminated immediately after by the time relay that controlled the operation of the welding current both as to period of flow and its amperage in the high pressure period.

The operations of the machine continue until all of the welders that may be connected with the shell 96 of the fluid control mechanism have been actuated and until the port 115 is moved to the passageway 116 succeeding the passageway to which the last of the welders to be operated is connected. This establishes a connection from the high pressure chamber 104 through the pipe 314 with the cylinder 315 and during the subsequent high pressure period, the piston 316, located in the cylinder 315, is operated to reverse the valve 266 to cause the flow of the fluid from the source of supply through the valve 254, the pipe 267, the valve 266, the pipe 317, to the ends of the cylinder 17 and the frame 11 is raised and passes the latches 21.

The indexing valve 95, however, continues to operate to step the movable valve member 106 and the port 115 past the plugged passageways 116 by the operation of the auxiliary time relay 321 which is set to respond at very short periods between closing and opening the circuit of the core 206 of the solenoid 201 that operates the core 200. The time period of the relay 321 is much shorter than the periods at which the time relays 157, 158 and 160 are set and does not affect the functioning of the said time relays. During the low pressure period following the operation of the piston 316, the master control switch 175 closes the contacts 182 and a current flows through the solenoid 177 and coacts with the current flowing through the solenoid 178, as described above, to cause the master control switch 175 to close the contacts 185 which completes the circuit through the solenoid 77 and operates the valve 67 to produce a high pressure period. The high pressure switch 231 again connects the auxiliary time relay 321 from the supply line 251 through the lines 277 and 323, the time relay 321, to the return line 252. The time relay again closes the circuit from the supply line 251 through the line 324 to the solenoid 206 which operates to move the dog 207 past the end of the switch 192 and upon the expiration of the short period at which the time relay 321 is set, the coil 206 is de-energized and the dog 207 opens the switch 192 which again breaks the circuit through the solenoid 178 and the master control switch 175 again opens the circuit through the contacts 185 and the valve 67 is closed.

The movable valve member 106 finally moves to a point such as to establish connection with the passageway 116 that is located contiguous to a passageway 116 that is connected to the first welder to be operated through the port 115. The passageway, thus connected to the pressure chamber 104 by the port 115, communicates with a cylinder 325 through the pipe 326, which operates the piston 327 during the subsequent high pressure period produced by the time relay 231, to operate the piston 327 and open the switch 261. The switch 261 is connected by the line 271 with the contact 182 of the master control switch 175 and when the switch 261 is opened, the circuit from the supply line 251 through the solenoid 177 and the movable contact member 181, the line 271, the switch 261 to the return line 252, is broken and, consequently, the solenoid 177, that coacts with the solenoid 178, is de-energized and will not operate the master control switch 175, and the valve 67 remains closed.

In a succeeding operation of the machine, the controls 213 are operated by the operators to establish a connection through the switch 261 as well as to release the latches 21 and the valve 266 is operated to lower the welders 24 and the frame 11. The switch 261 again reestablishes the circuit through the solenoid 177 which operates in conjunction with the solenoid 178 to cause the master control switch 175 to operate as before. The welders are, thus, sequentially operated until all of the welders that are mounted on the machine have again completed their operation.

When one of the operators desires to stop the operation of the machine for any reason, he releases the valve and switch control 213 held in machine-operating position by him which completes a circuit from the supply line 251 through the solenoid 328, the line 331, through the contacts 227, to the return line 252, and the circuit through the switch 261, the line 271, the contacts 182, the solenoid 177 from the supply line 251, is opened by release of the combined switch and valve control 213 which discontinues the operation of the master control switch 175. The solenoid 328 operates the core 332 which actuates the lever 264 to connect the ends of the cylinders 17 with the source of supply 248 through the pipes 317 whereupon the frame 11 is lifted and moved to a position such that it will be engaged by the latches 21.

The operators then make such adjustments or corrections as may be desired and if it is desired to again continue the operation of the machine by causing the operation of the welder next succeeding contiguous to the welder that produced the last operation before the frame was lifted, the valves of both controls are then operated sufficiently to move the latches 21 from engaging relation with the frame 11 but not sufficiently to complete the circuit of the switch 261, through the contacts 228, the line 271, the contacts 182, and the solenoid 177 until the frame 11, upon operation of the valve 266, has reached a position such as to locate the welders in operating relation with respect to the work, whereupon the controls 213 are further depressed to close the switch contacts 228 and reestablish the circuit through the switch 261 and the solenoid 177 and cause continued operation of the master control switch 175 to complete the welding operation of the machine.

I claim:

1. In a welding machine having a plurality of welders, a source of electric current, a period control means for controlling the period of flow of the welding current for desired periods, a movable electric control means, and switches operated by the electric control means for controlling the period control means to cause the flow of the welding current to certain of the welders and the work for periods of the same length and other of the welders and the work for periods of different lengths.

2. In a welding machine, a plurality of welders, a frame for supporting the welders, a fluid pressure means for moving the welders to and from the work, means for controlling the operation of the said pressure means, a second fluid pressure means, and a fluid control mechanism for directing fluid under pressure from the said second pressure means to the welders and to the control means of the first-named fluid pressure means in succession for moving the frame from the work subsequent to the operation of the welders.

3. In a welding machine having a plurality of welders, a source of supply of air under pressure, a pneumatic hydraulic booster, an electromagnetically operated valve for periodically directing air under pressure to the booster, a second valve for directing liquid under pressure from the booster to the welders, sequentially, means for operating the said second valve during the low pressure periods of the booster, and a period control switch for controlling the operations of the electromagnetically operated valve.

4. In a welding machine having a plurality of welders, a fluid pressure means for producing alternate high and low pressures, means for actuating the pressure means, means for transmitting fluid pressure to the welders in succession for sequentially operating the welders, a period control means for maintaining high pressure for any one of a plurality of predetermined periods of different lengths in the welders during their sequential operation, an electric control means operated by the pressure means for selectively controlling the period control means to vary the pressure periods of the welders, and means operated by the pressure means for initiating the period control means.

5. In a welding machine having a plurality of welders, a fluid pressure producing means, means for actuating the pressure means, means operated by the pressure means for transmitting fluid pressure from the pressure means to the welders, and an electric control means operated by the pressure means for automatically producing alternate high pressures and intermediate low pressures to produce the operation of the welders sequentially during the high pressure periods.

6. In a welding machine having a plurality of welders, a fluid pressure producing means, means for actuating the pressure means, means operated by the pressure means for transmitting fluid pressure from the pressure means to the welders, an electric control means operated by the pressure means for automatically producing alternate high pressures and intermediate low pressures, and means for sequentially connecting the welders to the pressure means during the low pressure periods to produce the operation of the welders in succession.

7. In a welding machine having a plurality of welders, a source of supply of air under pressure, a pressure device for converting air pressure to hydraulic pressure, a valve for directing air under pressure to the pressure converting means to operate the pressure converting means, a second valve for directing liquid under pressure from the pressure converting means to the welders sequentially, and a period control means initiated by the pressure of the liquid for closing the first-named valve to produce alternate high and low pressure periods to sequentially operate the welders during the high pressure periods.

8. In a welding machine having a plurality of welders, a source of supply of air under pressure, means for converting the air pressure from the said source to a hydraulic pressure, a valve, means operated by the pressure converting means for opening and closing the valve to actuate the pressure converting means to automatically produce alternate high and low hydraulic pressures, a second valve having a movable valve member, the said movable valve member having a passageway for transmitting hydraulic pressure from the said converting means to the welders in succession, means for operating the movable valve member during low pressure periods of the liquid, and a fluid pressure means for producing flow of the welding current to the welders during the high pressure periods.

9. In a welding machine having a plurality of welders, a source of supply of air under pressure, means for converting the air pressure from the said source to a hydraulic pressure, a valve, means operated by the pressure converting means for opening and closing the valve to actuate the pressure converting means to automatically produce alternate high and low hydraulic pressures, a second valve having a movable valve member, the said movable valve member having a passageway for transmitting hydraulic pressure from the said converting means to the welders in succession, means for operating the movable valve member during low pressure periods of the liquid, a switch means operated by the pressure converting means, a period control means initiated by the switch means, and means operated by the pressure converting means for selectively varying the period of flow of the welding current during the sequential operation of the welders.

10. In a welding machine having a plurality of welders, a source of supply of air under pressure, means for converting the air pressure from the said source to a hydraulic pressure, a valve, means operated by the pressure converting means for opening and closing the valve to actuate the pressure converting means to automatically produce alternate high and low hydraulic pressures, a second valve having a movable valve member, the said movable valve member having a passageway for transmitting hydraulic pressure from the said pressure converting means to the welders in succession, means for operating the movable valve member during the low pressure periods of the liquid, a switch means operated by the pressure of the liquid for producing flow of the welding current to the welders during high pressures, a current control means operated by the movable valve member, and a period control means and current varying means for selectively varying the amperage of the welding current, the period control means and the current varying means initiated by the switch means and controlled by the control means for selectively varying the period of flow of the welding current and the amperage of the welding current during the sequential operation of the welders.

11. In a welding machine, a plurality of welders, a fluid pressure means, means for connecting the welders to the said fluid pressure means in succession, means operated by the fluid pressure means for producing alternate high and low pressure periods by the said fluid pressure means, means for connecting the welders in succession with the said pressure means during the low pressure periods and to sequentially operate the welders during the high pressure periods until the first of the welders to be operated is connected to the said fluid pressure means, and means operated by the said fluid pressure means for causing cessation of the operation of the said fluid pressure means during a low pressure period.

12. In a welding machine, a plurality of welders, a fluid pressure means, means for connecting the welders to the said fluid pressure means in succession, means operated by the fluid pressure means for producing alternate high and low pressure periods by the said fluid pressure means, means for connecting the welders in succession with the said pressure means during the low pressure periods and to sequentially operate the welders during the high pressure periods, means for maintaining the alternate high and low pressure periods subsequent to the operation of the last of the welders to be operated and until the first of the welders to be operated is connected to the said fluid pressure means, and means operated by the said fluid pressure means for causing cessation of the operation of the said fluid pressure means during a subsequent low pressure period.

13. In a welding machine, a reciprocable frame, a plurality of welders mounted on the frame, a fluid pressure means for reciprocating the frame, a second fluid pressure means, means operated by the said second fluid pressure means for producing alternate high and low pressures by the said second pressure means to operate the welders in succession, and means operated by the said second fluid pressure means for controlling the transmission of fluid pressure to the frame reciprocating pressure means to cause the return of the said frame upon the completion of the operation of the welders.

WILLIAM H. MARTIN.